US010465556B2

(12) United States Patent
Kurle et al.

(10) Patent No.: US 10,465,556 B2
(45) Date of Patent: Nov. 5, 2019

(54) TURBOCHARGER HEAT SHIELD

(71) Applicant: BorgWarner Inc., Auburn Hills, MI (US)

(72) Inventors: Charles Kurle, Fletcher, NC (US); Michael Ward, Arden, NC (US); Brock Fraser, Asheville, NC (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 15/785,856

(22) Filed: Oct. 17, 2017

(65) Prior Publication Data

US 2019/0112945 A1  Apr. 18, 2019

(51) Int. Cl.
| | |
|---|---|
| F04D 29/58 | (2006.01) |
| F01D 25/14 | (2006.01) |
| F01D 25/16 | (2006.01) |
| F01D 5/04 | (2006.01) |
| F01D 25/24 | (2006.01) |
| F01D 9/02 | (2006.01) |
| F02B 37/02 | (2006.01) |

(52) U.S. Cl.
CPC .......... F01D 25/145 (2013.01); F01D 5/043 (2013.01); F01D 9/026 (2013.01); F01D 25/16 (2013.01); F01D 25/24 (2013.01); F02B 37/025 (2013.01); F05D 2220/40 (2013.01)

(58) Field of Classification Search
CPC .......... F05D 2220/40; F05D 2260/231; F05D 2240/15; F01D 5/08; F02C 7/24
See application file for complete search history.

(56) References Cited

U.S. PATENT DOCUMENTS

| | | | |
|---|---|---|---|
| 4,969,805 A * | 11/1990 | Romeo ................ | F01D 25/24 417/360 |
| 7,908,857 B2 | 3/2011 | Nordling | |
| 8,353,666 B2 | 1/2013 | Masson et al. | |
| 8,376,721 B2 | 2/2013 | Thayer et al. | |
| 8,545,172 B2 | 10/2013 | Severin et al. | |
| 9,011,089 B2 | 4/2015 | Solanki et al. | |
| 9,212,700 B1 * | 12/2015 | Bucking ............... | F16C 37/007 |
| 9,988,977 B2 * | 6/2018 | Crandall ............... | F01D 5/046 |
| 2009/0053044 A1 | 2/2009 | Ward | |
| 2011/0014036 A1 * | 1/2011 | Boening ................ | F02C 6/12 415/177 |

(Continued)

FOREIGN PATENT DOCUMENTS

| | | |
|---|---|---|
| DE | 102014218199 A1 | 3/2016 |
| DE | 102014223306 A1 | 5/2016 |

(Continued)

*Primary Examiner* — Long T Tran
(74) *Attorney, Agent, or Firm* — Young Basile Hanlon & MacFarlane, P.C.

(57) ABSTRACT

A heat shield for a turbocharger has a disc-like configuration. The heat shield includes an outer radial portion, an outer wall, a connecting wall, and an inner wall. The outer radial portion is disposed circumferentially around an axis of the heat shield. The outer wall extends from the outer radial portion in a first axial direction. The connecting wall extends radially inward substantially perpendicularly from the outer wall. The inner wall extends substantially perpendicularly from the connecting wall in a second axial direction opposite the first axial direction.

26 Claims, 6 Drawing Sheets

(56) References Cited

U.S. PATENT DOCUMENTS

| | | |
|---|---|---|
| 2013/0154194 A1 | 6/2013 | Van Saun |
| 2015/0252689 A1* | 9/2015 | Burmester ................ F02C 6/12 415/177 |
| 2015/0285132 A1* | 10/2015 | Chekansky ............. F02B 37/12 415/144 |
| 2016/0102678 A1 | 4/2016 | Crandall et al. |
| 2016/0265388 A1* | 9/2016 | Annati .................... F01D 25/26 |
| 2016/0298490 A1 | 10/2016 | Hettinger et al. |
| 2016/0341072 A1 | 11/2016 | Chandramohanan et al. |
| 2017/0145912 A1* | 5/2017 | Micanek ............... F01D 17/165 |

FOREIGN PATENT DOCUMENTS

| | | |
|---|---|---|
| EP | 2778349 A1 | 9/2014 |
| EP | 2818664 A1 | 12/2014 |
| WO | 2015119828 A1 | 8/2015 |

\* cited by examiner

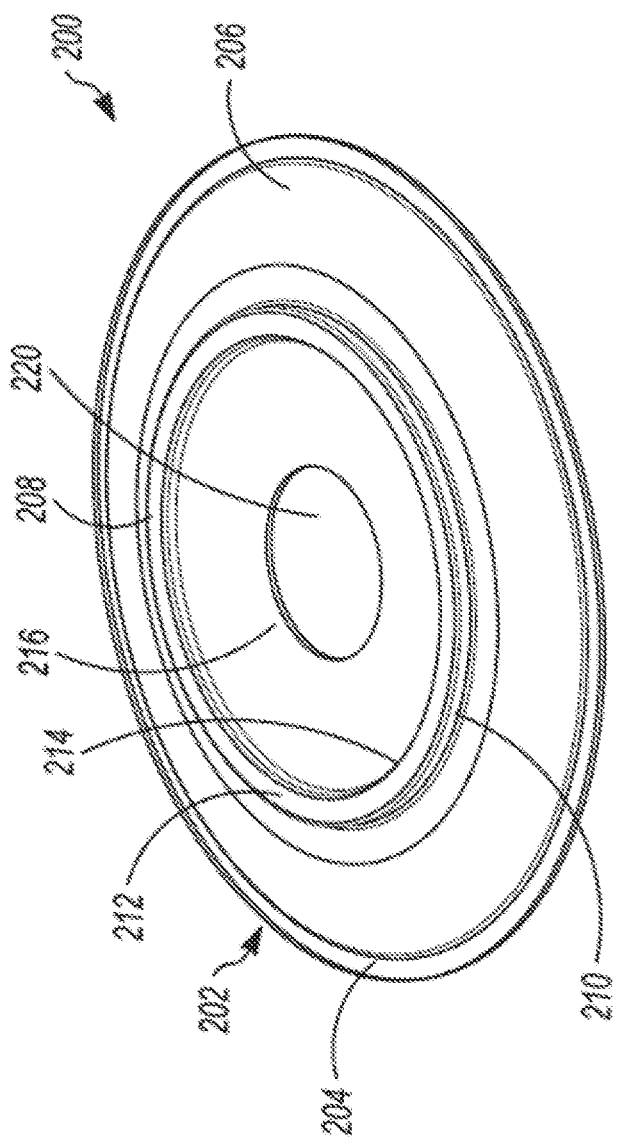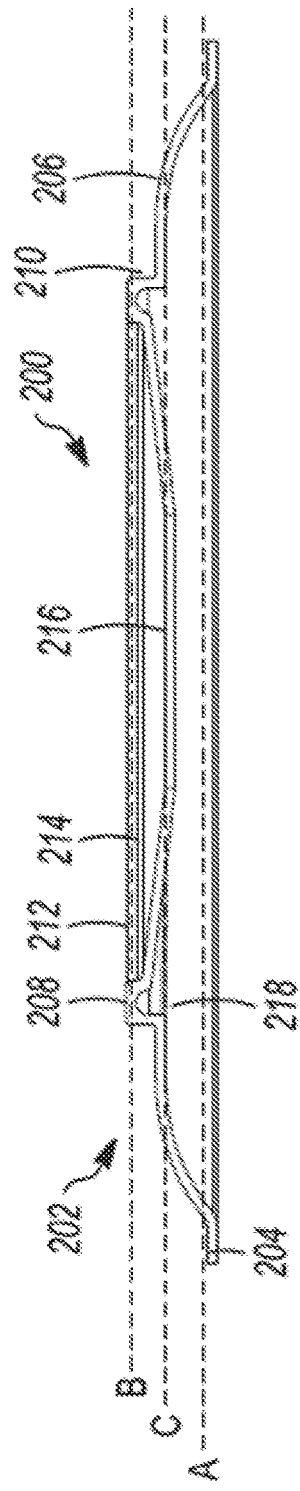
FIG. 3A
FIG. 3B

TURBOCHARGER HEAT SHIELD

TECHNICAL FIELD

This disclosure relates to turbochargers, and more particularly, to turbochargers with heat shields.

BACKGROUND

Turbochargers are forced-induction devices that are utilized to increase the pressure of the intake air provided to an internal combustion engine. Exhaust gas from the engine is routed to the turbocharger to drive a turbine wheel. The torque generated by the turbine wheel drives a compressor wheel, which pressurizes intake air for supply to the engine. By pressurizing the intake air, the engine may have increased power output compared to an otherwise comparable naturally-aspirated engine.

The turbine wheel and the compressor wheel may be connected by a shaft, which is rotatably supported in a bearing housing positioned therebetween. High temperatures associated with the exhaust gas increases may increase temperature of the bearing housing and/or lubrication or cooling features associated with the bearing housing. As the temperature associated with the bearing housing increases, the lubrication or cooling features may become ineffective, components of the bearing housing may become damaged or rendered ineffective, other components associated with the turbocharger may become damaged or rendered ineffective, or a combination thereof.

To limit heat transfer from the exhaust to the bearing housing, a heat shield may be positioned between the turbine wheel and the bearing housing. The heat shield is configured as a plate- or disc-like structure, which may be subject to thermal growth primarily in the radial direction. When constrained in the radial direction, the heat shield may deflect axially. Such axial deflection of the heat shield may have undesired consequences such as creating too little clearance to the turbine wheel, which may result in collision with the turbine wheel or even undesirable aerodynamic conditions causing frictional losses or unfavorable seal pressure gradients.

SUMMARY

Disclosed herein are aspects, features, elements, implementations, and embodiments of turbochargers having a heat shield.

In one implementation, a heat shield for a turbocharger has a disc-like configuration. The heat shield includes an outer radial portion, an outer wall, a connecting wall, and an inner wall. The outer radial portion is disposed circumferentially around an axis of the heat shield. The outer wall extends from the outer radial portion in a first axial direction. The connecting wall extends radially inward substantially perpendicularly from the outer wall. The inner wall extends substantially perpendicularly from the connecting wall in a second axial direction opposite the first axial direction.

In another implementation, a heat shield is to be arranged in a turbocharger between a turbine housing and a bearing housing thereof. The heat shield includes a first radial portion, a second radial portion, and a radial deflection portion. The second radial portion is arranged radially inward of the first radial portion. The radial deflection portion extends radially from the first radial portion to the second radial portion. The radial deflection portion is U-shaped with an outer wall extending from the first radial portion substantially parallel with an axis of the heat shield, a connecting wall extending radially inward from the outer wall, and an inner wall extending from the connecting wall substantially parallel with the axis to the second radial portion.

In a further implementation, a turbocharger assembly includes a turbine housing, a turbine wheel, a bearing housing, a shaft, and a heat shield. The turbine wheel is arranged in the turbine housing. The shaft is coupled to the turbine wheel and extends into the bearing housing. The heat shield is arranged between the turbine housing and the bearing housing. The heat shield includes an outer radial portion, an inner radial portion, an outer wall, an inner wall, and a connecting wall. The outer wall extends from the outer radial portion substantially parallel with the shaft. The connecting wall extends radially inward from the outer wall. The inner wall extends from the connecting wall to the inner radial portion substantially parallel with the shaft.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 3A is a perspective view of the heat shield of the turbocharger shown in FIG. 2.

FIG. 3B is a cross-sectional view of the heat shield shown in FIG. 3A.

DETAILED DESCRIPTION

Disclosed herein are embodiments of heat shields geometries that control the growth and position of the heat shield during thermal stress (e.g., expansion).

Figure 1:
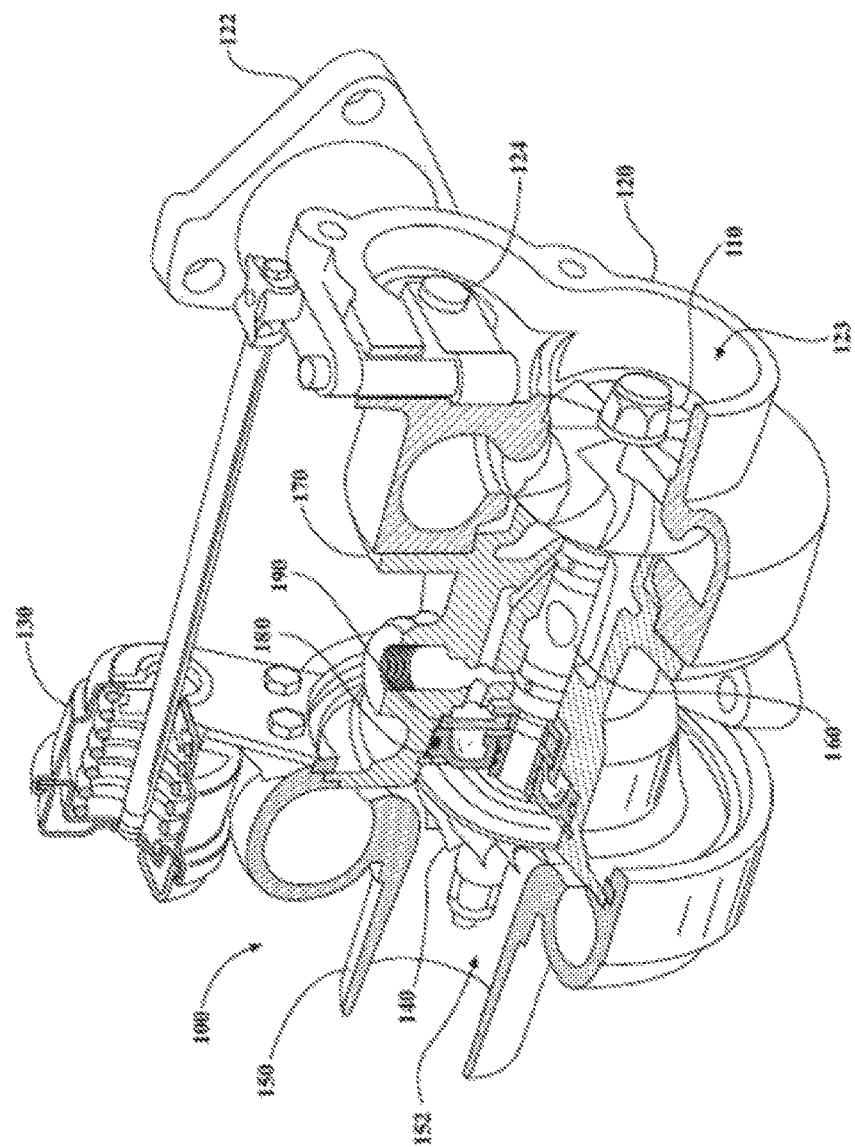
FIG. 1 generally illustrates a perspective partial cross-section view of a turbocharger according to the principles of the present disclosure.

FIG. 1 shows a turbocharger 100 that is an exhaust-gas driven forced induction device that is utilized in conjunction with an internal combustion engine (not shown). The turbocharger 100 includes a turbine wheel 110 located in a turbine housing 120. The turbine housing 120 includes an exhaust gas inlet 122 for receiving exhaust gas from the internal combustion engine. Exhaust gas is routed from the exhaust gas inlet 122 to the turbine wheel 110 before exiting the turbine housing 120 at an exhaust gas outlet 123. For example, the exhaust gas may flow from the exhaust gas inlet 122 tangentially and/or radially through a volute formed by the turbine housing 120 to the turbine wheel 110, and then flow axially out of the exhaust gas outlet 123.

The turbocharger 100 includes a compressor wheel 140 located in a compressor housing 150. The compressor housing 150 includes an intake air inlet 152 and an intake air outlet (not shown). Intake air is routed from the intake air inlet 152 to the compressor wheel 140, where the intake air is pressurized by rotation of the compressor wheel 140. The intake air then exits the compressor housing 150 at the intake air outlet before being supplied to the internal combustion engine.

Rotation of the compressor wheel 140 is driven by rotation of the turbine wheel 110. In particular, the turbine wheel 110 and the compressor wheel 140 are each connected to a shaft 160. The shaft 160 can be a substantially rigid member, and each of the turbine wheel 110 and the compressor wheel 140 can be connected to the shaft 160 in a manner that prevents rotation of the turbine wheel 110 and the compressor wheel 140 with respect to the shaft 160. As a result, the compressor wheel 140 can rotate in unison with the turbine wheel 110 in response to rotation of the turbine wheel 110.

The shaft 160 is supported within a bearing housing 170 such that the shaft 160 can rotate freely with respect to the bearing housing 170 at a high rotational speed. The bearing housing 170, the turbine housing 120 and the compressor housing 150 are all arranged along an axis of rotation of the shaft 160. In particular, the bearing housing 170 is positioned between the turbine housing 120 and the compressor housing 150, with a first end of the bearing housing 170 connected to the turbine housing 120 and a second end of the bearing housing 170 connected to the compressor housing 150. The bearing housing 170 can incorporate lubrication and/or cooling features.

The bearing housing 170 defines a cavity, which contains the shaft 160 and a thrust bearing 190. The cavity may be closed by an oil seal plate 180 (e.g., cover, closure, etc.). The shaft 160, the thrust bearing 190, and the oil seal plate 180 function to cooperatively transfer axial force (e.g., axial loading) from the turbine wheel 110 to the bearing housing 170 and, thereby, locate the shaft 160 axially relative to the bearing housing 170.

A wastegate valve 124 may be mounted in the turbine housing 120 to allow the exhaust gas to bypass the turbine wheel 110. For example, the wastegate valve 124 is adapted to divert exhaust gas away from the turbine wheel 110. The diversion of exhaust gas may be used to control turbine speed, which in turn controls a rotational speed of the compressor wheel 140. By controlling the rotational speed of the compressor wheel 140, the wastegate valve 124 can regulate the maximum ambient air pressure in the turbocharger 100. In some embodiments, a wastegate control assembly is adapted to open and close the wastegate valve 124. The wastegate control assembly causes the wastegate valve 124 to open when exhaust gas pressure is high and close when exhaust gas pressure drops. For example, the wastegate control assembly includes an actuator 130. The actuator 130 may include an electric actuator, a mechanical actuator, a pneumatic actuator, a hydraulic actuator, or other suitable actuator. The actuator 130 is adapted to move the wastegate valve 124 between an open position when exhaust gas pressure is high and a closed position when exhaust gas pressure drops.

Figure 2:
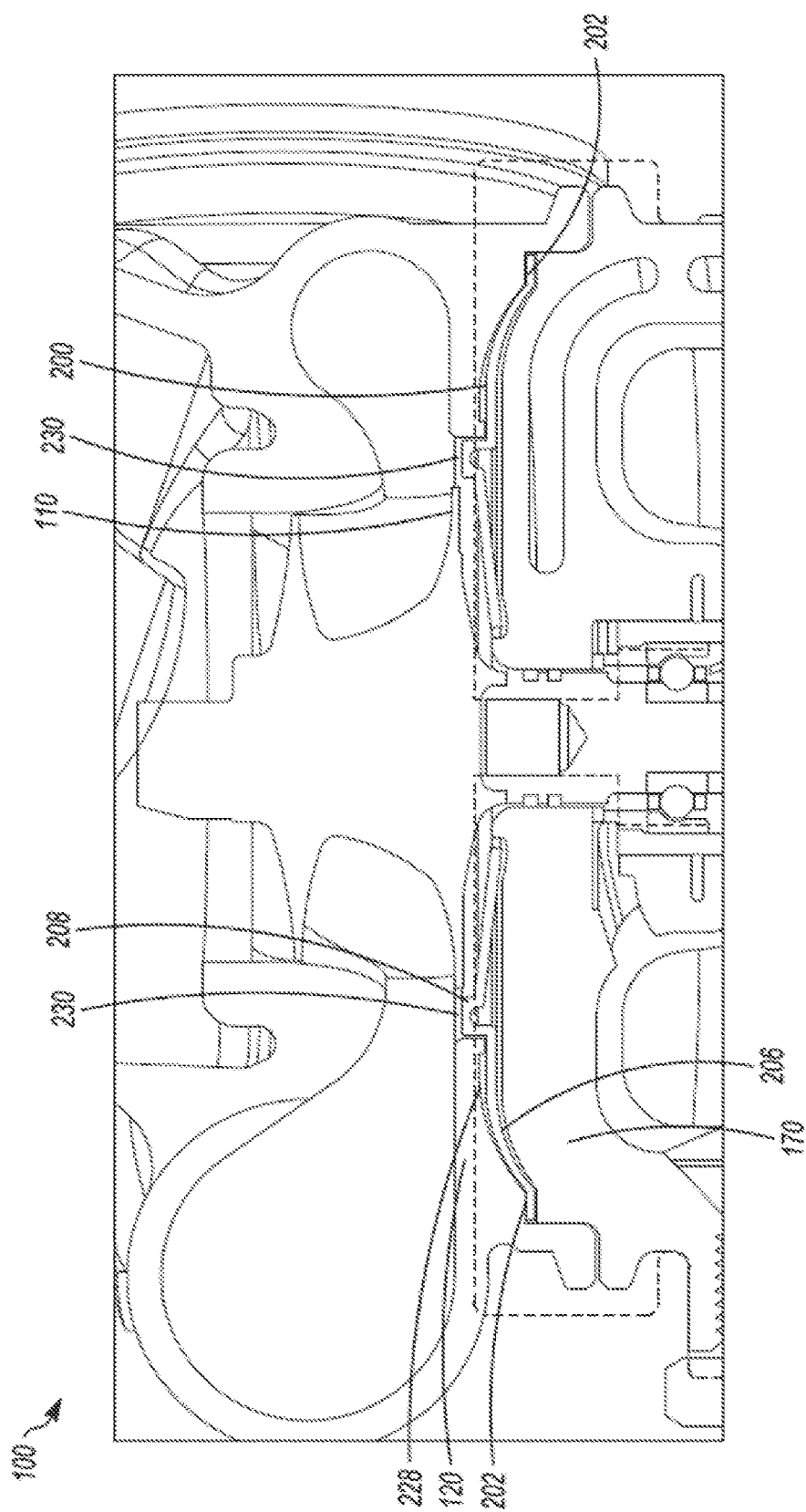
FIG. 2 generally illustrates a partial cross-section view of a turbocharger having a heat shield according to the principles of the present disclosure.

In some embodiments, a heat shield, such as a heat shield 200 generally illustrated in FIGS. 2, 3A, and 3B, can be disposed between the turbine wheel 110 and the bearing housing 170. The heat shield 200 is adapted to deflect heat from the exhaust gas away from the bearing housing 170 in order to control the temperature associated with the bearing housing 170.

The heat shield 200 may include a geometry that provides thermal growth control and position control of the heat shield 200 while the heat shield 200 is under thermal stress. The heat shield 200 may comprise steel, aluminum, or other suitable material and includes a disc-like or substantially disc-like profile or configuration. For example, the heat shield 200 may be a stamped and/or unitary structure (e.g., component).

The heat shield 200 includes a first radial portion 202, a radial deflection portion 208, and a second radial portion 216, each of which extend circumferentially around an axis of the heat shield 200 (e.g., around the shaft 160). The first radial portion 202 originates from a peripheral edge (e.g., outer perimeter or circumference) of the heat shield 200 and extends radially inward. The radial deflection portion 208 extends radially inward from an inner periphery of the first radial portion 202 to an outer periphery of the second radial portion 216. The radial deflection portion 208 may also be referred to as a bellows (e.g., circumferential bellows), an intermediate radial portion, or a radial compression portion or feature. The second radial portion 216 extends radially inward from the radial deflection portion 208 to an inner edge of the heat shield 200, which defines a central bore 220 (e.g., aperture) through which the shaft 160 may extend.

As discussed in further detail below, the radial deflection portion 208 is configured to deflect (e.g., compress, deform, or bend) radially to accommodate relative radial movement (e.g., radial expansion or radial growth) between the first radial portion 202 and the second radial portion 216 from thermal stress. The radial deflection portion 208, thereby, may limit axial deflection of the heat shield 200 and resultant problems that might otherwise occur (e.g., interference with the turbine wheel 110) without accommodating such relative radial movement. The first radial portion 202 and/or the second radial portion 216 may also deflect axially in manners controlled (e.g., limited) at least in part by provision of the radial deflection portion 208. As also discussed below, variations of the heat shield 200 may include multiple radial compression features.

The first radial portion 202 is configured to be secured to the turbocharger 100. When secured to the turbocharger 100, the heat shield 200 may be radially constrained at the peripheral edge thereof. For example, the first radial portion 202 may be compressed axially between the turbine housing 120 and the bearing housing 170. More particularly, the first radial portion 202 may include an outer sub-portion 204 that is substantially planar and that extends in a plane A, which is perpendicular to the axis of the shaft 160. The outer sub-portion 204 of the first radial portion 202 may also be referred to as an attachment portion, a clamped portion, or a planar portion.

Another portion of the first radial portion 202 of the heat shield 200 may be configured to deflect axially relative to the turbine housing 120 and/or the bearing housing 170. For example, the first radial portion 202 may further include an inner sub-portion 206 that extends radially inward from the outer sub-portion 204 to the radial deflection portion 208 of the heat shield 200. The turbine housing 120 and the bearing housing 170 are spaced apart axially to form a gap 228 in which the inner sub-portion 206 is positioned. The gap 228 has a larger axial dimension than the inner sub-portion 206 (e.g., the turbine housing 120 and the bearing housing 170 are spaced apart a distance greater than a thickness of the inner sub-portion 206 of the heat shield 200). When the heat shield 200 is under thermal stress, the gap 228 allows the first radial portion 202 of the heat shield 200 to deflect axially (e.g., until contacting the turbine housing 120 or the bearing housing 170). The gap 228 may also allow the inner sub-portion 206 to translate radially to permit, rather than constrain, radial growth. When the heat shield 200 is not under thermal stress, the inner sub-portion 206 is not compressed between the turbine housing 120 and the bearing housing 170 (e.g., by not contacting the turbine housing 120, the bearing housing 170, or both). It should be noted that variations of the heat shield 200 may omit the inner sub-portion 206 of the first radial portion 202 of the heat shield 200, such that the radial deflection portion 208 extends directly from the first radial portion 202 (e.g., see heat shield 200" in FIG. 6, discussed below).

The inner sub-portion 206 may have a generally convex profile (e.g., cross-sectional shape or curvature). For example, moving radially inward, the inner sub-portion 206 may protrude axially away from the bearing housing 170 toward the turbine housing 120. The turbine housing 120 and/or the bearing housing 170 may have corresponding profiles to form the gap 228 to receive the inner sub-portion 206 therein and to accommodate axial deflection and/or radial movement of the inner sub-portion 206 therein. This arrangement of the convex profile of the first radial portion 202 (e.g., the inner sub-portion 206 thereof) of the heat shield 200 may result in axial deflection thereof toward the turbine housing 120 (e.g., away from the bearing housing 170) with thermal growth of the heat shield 200. Such axial deflection may, therefore, be limited by the inner sub-portion 206 engaging the turbine housing 120. The inner sub-portion 206 of the first radial portion 202 has a radial dimension (e.g., radius) that is greater than that of the radial deflection portion 208, such as more than two times greater.

The first radial portion 202, the outer sub-portion 204 thereof, and/or the inner sub-portion 206 may also be referred to as primary portions (e.g., an outer primary portion) or radially elongated portions (e.g., for extending in a radial direction significantly further than in an axial direction, for example, by being planar or extending radially two, three, four or more times than extending axially).

As referenced above, the radial deflection portion 208 of the heat shield 200 extends radially between the first radial portion 202 and the second radial portion 216. The radial deflection portion 208 is adapted to deflect (e.g., compress, bend, or otherwise deform) in a radial direction (e.g., fold in a bellows-like fashion into itself) in response to thermal stresses acting on the heat shield 200. The radial deflection portion 208 may be configured as a U-shaped protrusion that forms or defines a gap extending in a radial direction between the first radial portion 202 and the second radial portion 216 and circumferentially around the axis. This gap permits relative radial movement between the first radial portion 202 and the second radial portion 216. For example, the first radial portion 202, being constrained radially at the outer periphery thereof, may expand radially inward, while the second radial portion 216 may expand radially outward. In some embodiments, an inner portion of the radial deflection portion 208 is adapted to radially deflect between 0.4 millimeters and 0.6 millimeters and an outer portion of the radial deflection portion 208 is adapted to radially deflect between 0.5 millimeters and 0.7 millimeters.

When the heat shield 200 is assembled in the turbocharger 100, the radial deflection portion 208 may be positioned axially between the turbine wheel 110 and the bearing housing 170 and radially inward of the turbine housing 120. For example, the radial deflection portion 208 may be positioned in a recess formed radially inward of an inner radial end of a volute wall of the turbine housing 120, which defines the volute. The radial deflection portion 208 may, for example, protrude axially away from the bearing housing 170 to a second plane B. The heat shield 200 may, for example, have an overall axial length extending between the first plane A and the second plane B. Further aspects of the radial deflection portion 208, including the U-shaped protrusion, are discussed in further detail below.

The second radial portion 216 extends radially inward from the radial deflection portion 208 to an inner periphery of the heat shield 200, which forms the central bore 220 of the heat shield 200. When the heat shield 200 is assembled in the turbocharger 100, the second radial portion 216 is positioned axially between the turbine wheel 110 and the bearing housing 170. The second radial portion 216 may extend to a third plane C in which the central bore 220 is positioned. For example, as shown, the second radial portion 216 may extend from the radial deflection portion 208 axially toward the bearing housing 170, so as to be concave relative to the turbine wheel 110, or may extend wholly or partially in the third plane C. The third plane C is parallel or substantially parallel to the second plane B and may be positioned axially between the second plane B and the first plane A. The second radial portion 216 may be adapted to deflect axially when the heat shield 200 is under thermal stress. For example, by having a concave configuration relative to the turbine wheel 110, the second radial portion 216 may deflect away from the turbine wheel 110 and toward the bearing housing 170 when expanding radially under thermal stress. In some embodiments, the second radial portion 216 is adapted to axially deflect between 0.35 millimeters and 0.75 millimeters. The second radial portion 216 may extend from the radial deflection portion 208 perpendicular or substantially perpendicular angle relative thereto (e.g., 90+/−5, 10, or 15 degrees) or at another suitable angle. The second radial portion 216 has a radial dimension (e.g., radius) that is greater than that of the radial deflection portion 208, such as greater than two times. The second radial portion 216 may be referred to as a primary portion of the heat shield 200, such as an inner primary portion, or a radially elongated portion.

As referenced above, the radial deflection portion 208 of the heat shield 200 deflects (e.g., deforms, bends, compresses, etc.) radially to accommodate relative radial movement (e.g., from thermal growth) of the first radial portion 202 and the second radial portion 216. For example, the radial deflection portion 208 is generally U-shaped in cross-section and includes an outer wall 210, an inner wall 214, and a connecting wall 212 that extends radially between the outer wall 210 and the inner wall 214. When the heat shield 200 is under thermal stress, the outer wall 210 and/or the inner wall 214 deflect toward one another to account for radial growth of the heat shield 200 (e.g., relative radial movement between the first radial portion 202 and the second radial portion 216).

The outer wall 210 extends from an inner periphery of the first radial portion 202 to an outer periphery of the connecting wall 212. In some embodiments, as shown in the cross-sectional view of FIGS. 2 and 3B, the outer wall 210 extends in an axial direction from a fourth plane (not labeled) at which the outer wall 210 transitions from the first radial portion 202. For example, the outer wall 210 may extend parallel, or substantially parallel with the axis, such as within positive 5, 10, or 15 degrees of the axis (e.g., being canted toward the axis moving toward the turbine housing 120). The outer wall 210 may also extend in the axial direction perpendicular or substantially perpendicular to the first radial portion 202 (e.g., 90 degrees+/−5, 10, or 15 degrees relative to the outer sub-portion 204 or from the inner sub-portion 206), or another suitable angle. The outer wall 210 may, in cross-section, extend axially in a straight or curved manner. The axial direction may, for example, be measured between two axially opposite points on exterior outer surface of the outer wall 210 between any curved transition (e.g., fillet) between the first radial portion 202 and the connecting wall 212, or in another suitable manner. The outer wall 210 extends circumferentially around the axis of the shaft 160 and forms an outer dimension of the radial deflection portion 208. In some embodiments, the outer wall 210 may be closer to the outer sub-portion 204 or further from the outer sub-portion 204 than is generally illustrated in FIG. 3A. For example, as discussed in further detail below with respect the heat shield 200" in FIG. 6, the inner sub-portion 206 may be omitted, such that a radial deflection portion 208" extends directly from a first radial portion 204" of a heat shield 200", which is entirely planar.

The connecting wall 212 extends circumferentially around the axis and in a radial direction inward from the outer wall 210 to the inner wall 214. In some embodiments, the connecting wall 212 extends radially inward from the outer wall 210 perpendicular or substantially perpendicular to the axis (e.g., within 5, 10, or 15 degrees of perpendicular) and/or to the outer wall 210 (e.g., within 5, 10, or 15 degrees of perpendicular to the outer sub-portion 204 or the inner sub-portion 206), or other suitable angle. The connecting wall 212 may extend in the second plane B, which is parallel to the first plane A. It should be noted that the connecting wall 212 may, in cross-section, extend radially in a straight or curved manner. The radial direction may, for example, be measured between two radially opposite points on an exterior surface of the connecting wall 212 between any curved transitions (e.g., radius or fillet) with the outer wall 210 and the inner wall 214, or in another suitable manner.

Figure 5:
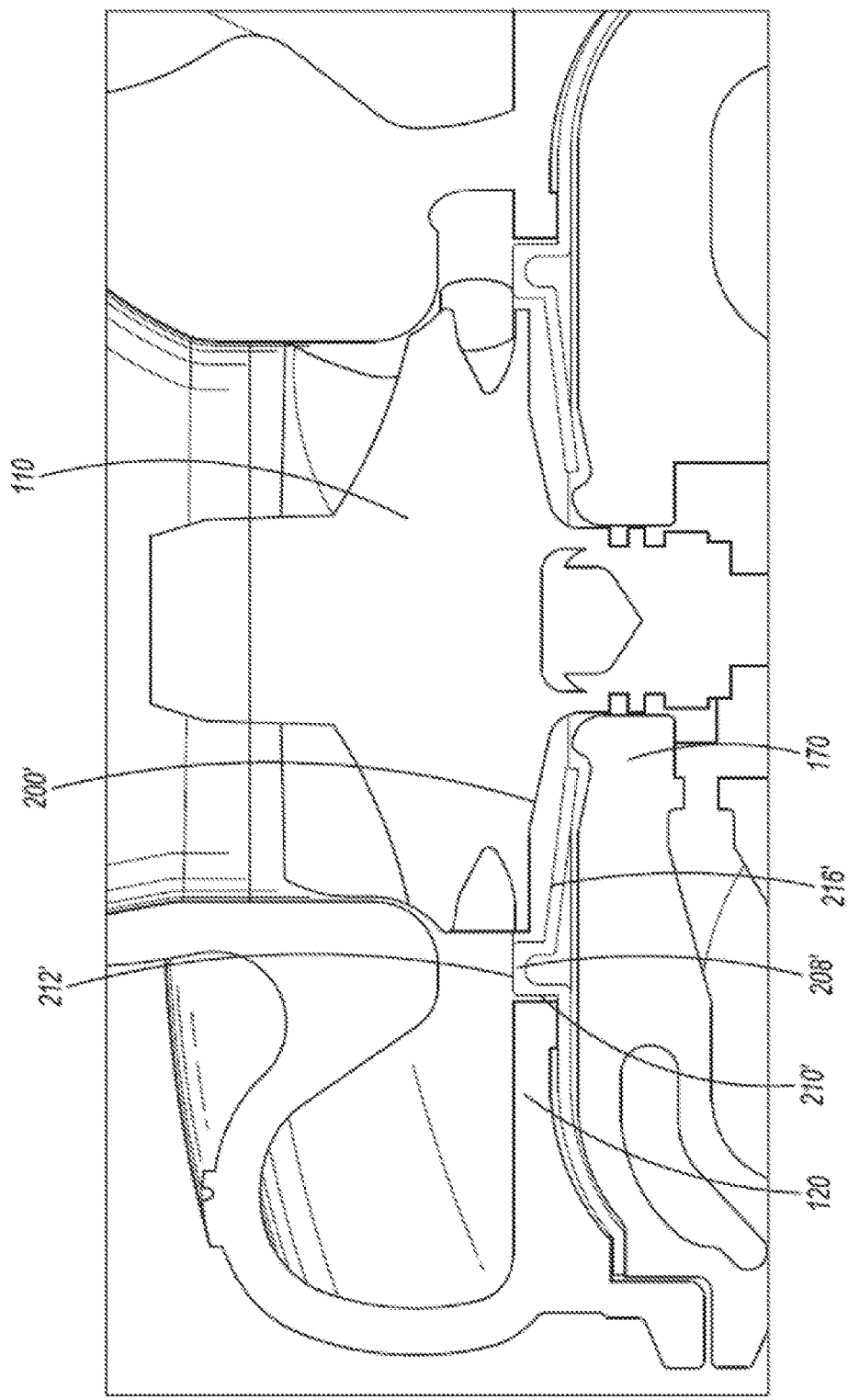
FIG. 5 generally illustrates a partial cross-section view of a turbocharger having a heat shield according to the principles of the present disclosure.

The radial deflection portion 208 may, as shown in FIG. 2, be recessed slightly in an axial direction relative to an axial surface of the volute wall, thereby forming an axial offset 230 (e.g., gap) therebetween. That is, the connecting wall 212 (and/or the second plane B) may be axially recessed relative to the axial surface of the volute wall. Alternatively, as shown in FIG. 5, another heat shield 200', which is a variation of the heat shield 200, includes the radial deflection portion 208' that is flush with the axial surface of the volute wall.

The inner wall 214 extends circumferentially around the axis and in an axial direction from an inner periphery of the connecting wall 212 to an outer periphery of the second radial portion 216 of the heat shield 200. The inner wall 214, for example, terminates at a fifth plane (not labeled) at which the second radial portion 216 transitions from the inner wall 214, which may be parallel with and between the second plane B and the fourth plane. The inner wall 214 may have an axial dimension (e.g., length) that is different (e.g., less) than that of the outer wall 210.

The inner wall 214 extends from the connecting wall 212 generally opposite the direction in which the outer wall 210 extends to the connecting wall 212 (e.g., such that the gap is formed between the inner wall 214 and the outer wall 210). The gap between the inner wall 214 and the outer wall 210 may have approximately the same radial dimension or increase in radial dimension moving away from the connecting wall 212 (e.g., toward the turbine housing 170). For example, the inner wall 214 may extend parallel, or substantially parallel with the axis, such as within negative 5, 10, or 15 degrees of the axis. The inner wall 214 may also extend in the axial direction perpendicular or substantially perpendicular to the connecting wall 212 (e.g., 90 degrees+/−15 degrees), or another suitable angle. The inner wall 214 may, in cross-section, extend radially in a straight or curved manner. The axial direction may, for example, be measured between two radially opposite points on an exterior surface (e.g., facing the turbine wheel 110) of the inner wall 214 between any curved transition (e.g., fillet) between the connecting wall 212 and the second radial portion 216, or in another suitable manner.

In some embodiments, the radial deflection portion 208 has an inner profile 218 defined by an interior surface of the outer wall 210, the connecting wall 212, and the inner wall 214. The inner profile 218 may include a round or substantially round profile (e.g., a profile that defines an arc), a square or substantially square profile (e.g., a profile having right angle or substantial right angle corners), or other suitable profile shape. The inner profile 218 of the radial deflection portion 208 provides the gap (e.g., a cutaway or an opening) that allows the radial deflection portion 208 to deflect (e.g., expand, contract, deform, or a combination thereof) when the heat shield 200 is under thermal stress.

Figure 4:
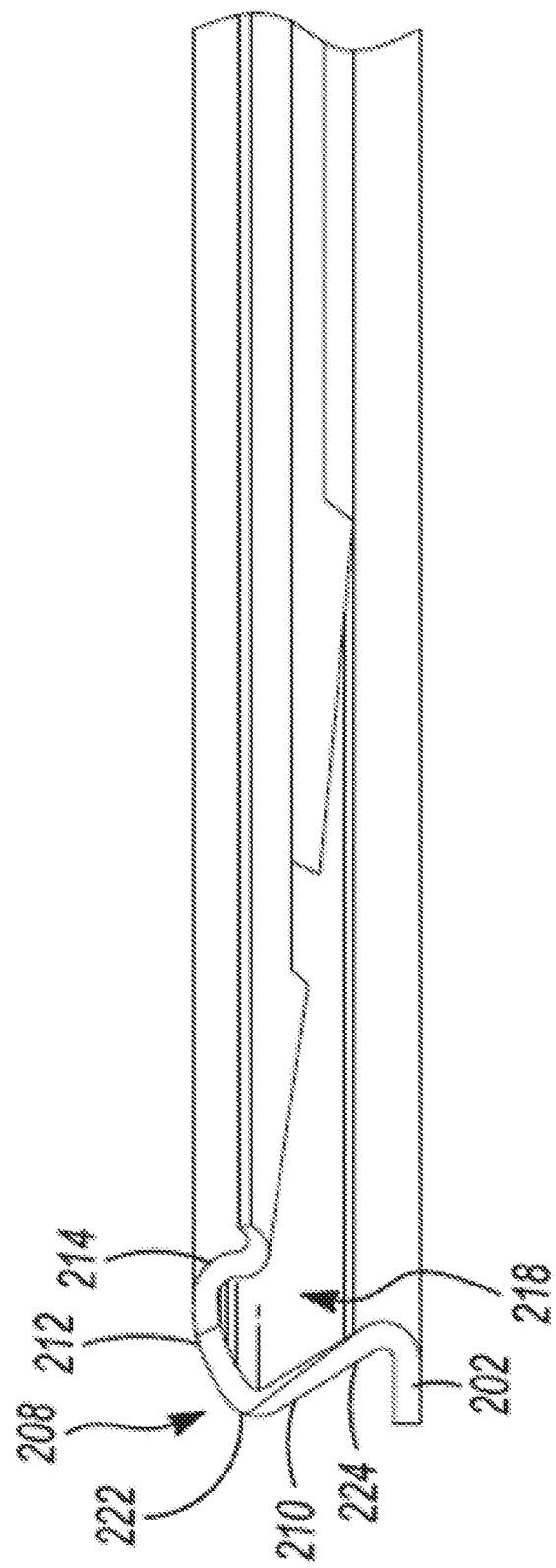
FIG. 4 generally illustrates the heat shield generally illustrated in FIGS. 3A and 3B under thermal stress according to the principles of the present disclosure.

As is generally illustrated in FIG. 4, when the heat shield 200 is under thermal stress, the inner periphery of the first radial portion 202, the outer periphery of the second radial portion 216 of the heat shield 200, or both may move toward each other (e.g., radially inward and/or radially outward, respectively). As a result, the radial deflection portion 208 deflects, for example, with the outer wall 210 leaning radially outward relative to the first radial portion 202 (e.g., bending outward so as to reduce the angle therebetween). The connecting wall 212 may also deflect responsive to the thermal stress, for example, with an outer periphery thereof shifting radially outward relative to the inner periphery of the first radial portion 202 of the heat shield 200. For example, an upper portion 222 of the outer wall 210 translates or moves outward toward the first radial portion 202 of the heat shield 200. A lower portion 224 of the outer wall 210 may deform as the upper portion 222 translates or moves toward the first radial portion 202, such that, the lower portion 224 of the outer wall 210 translates or moves away from the first radial portion 202 toward the axis. The inner wall 214 may also deflect, for example, as the outer periphery of the second radial portion 216 moves outward. When the heat shield 200 is no longer under thermal stress, the radial deflection portion 208, including the outer wall 210, the connecting wall 212, and the inner wall 214 may return to an original shape, profile, or configuration, such as is generally illustrated in FIGS. 3A and 3B.

As referenced above, the heat shield 200' is a variation of the heat shield 200. The heat shield 200' includes an outer radial portion, a radial deflection portion 208', and a second radial portion 216'. The radial deflection portion 208' is configured similar to the radial deflection portion 208 by including an outer wall 210', a connecting wall 212', and an inner wall 214'. The outer wall 210' may include a larger axial dimension than the outer wall 210, such that, the connecting wall 212' is disposed closer to the turbine housing 120 than the connecting wall 212 of the radial deflection portion 208. That is, while the connecting wall 212 is recessed relative to the axial surface of the volute wall of the turbine housing 120, the connecting wall 212' may be flush therewith (e.g., having a common axial position).

Figure 6:
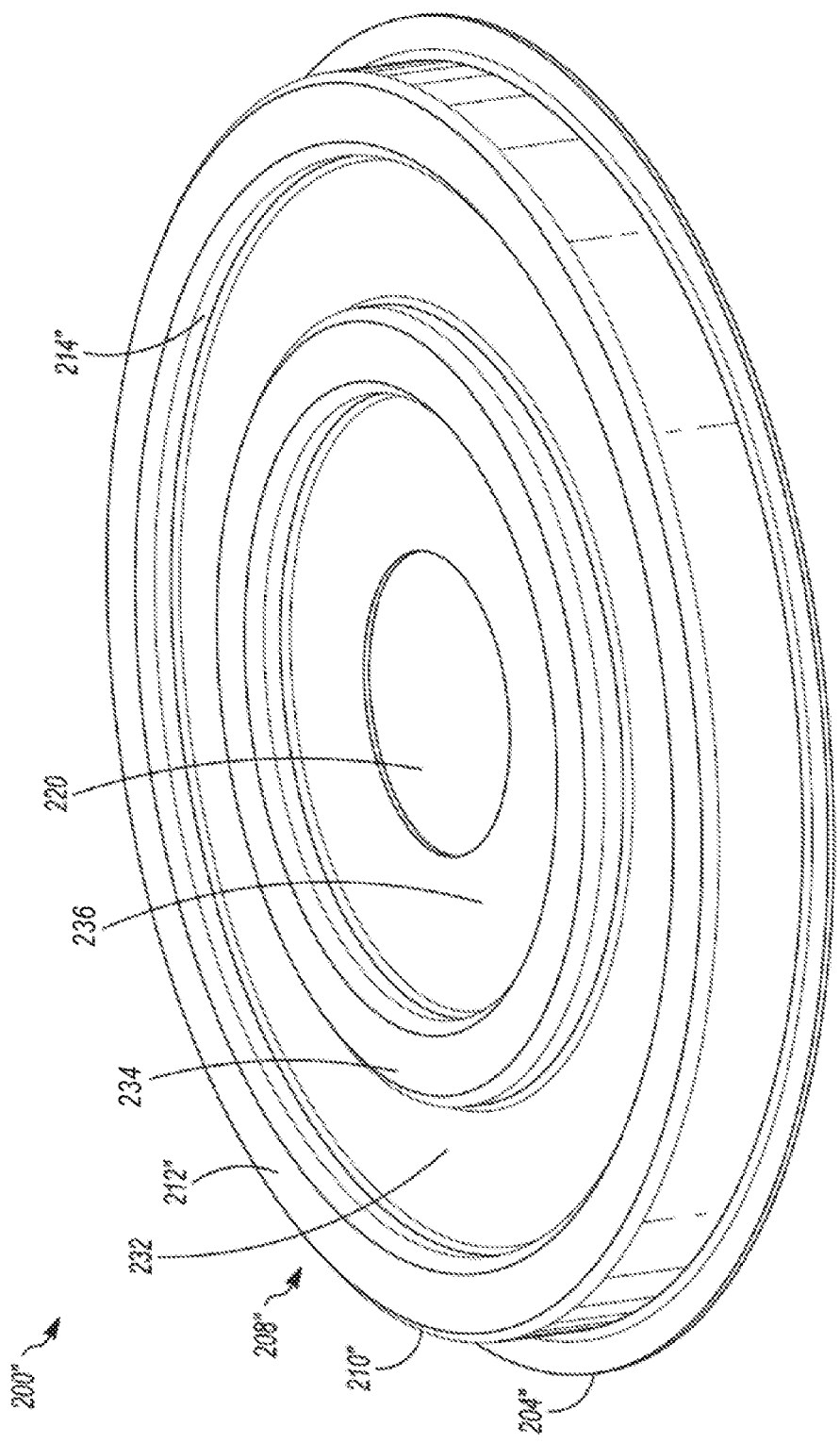
FIG. 6 generally illustrates a perspective view of another heat shield according to the principles of the present disclosure.

FIG. 6 generally illustrates a perspective view of the heat shield 200". As referenced above, variations of the heat shield 200 may include different numbers of radial deflection features and/or different locations of the radial deflection features relative to the connecting and/or primary portions of the heat shield. For example, the heat shield 200"

includes two radial deflection portions, one of which is in close proximity to (e.g., extends directly from) an attachment portion. For example, as shown, the heat shield 200" extends radially inward from an outer periphery to an inner periphery thereof, which defines the central bore 220. Moving radially inward from the outer periphery, the heat shield 200" includes the first radial portion 204", the first radial deflection portion 208", a second radial portion 232, a second radial deflection portion 234, and a third radial portion 236.

The first radial portion 204" is configured to secure to the turbocharger (e.g., being compressed between the turbine housing 120 and the bearing housing 170). The first radial portion 204" may, for example, be configured similar to the outer sub-portion 204 of the first radial portion 202 of the heat shield 200. The first radial portion 204" may also be referred to as an outer radial portion or an attachment portion.

The first radial deflection portion 208", which may be referred to as an outer radial deflection portion, extends radially inward from the first radial portion 204" to the second radial portion 232. The first radial deflection portion 208" may be configured similar to the radial deflection portion 208 of the heat shield 200 to accommodate relative radial movement between the first radial portion 204", whose inner periphery may be held substantially stationary, and the second radial portion 232, whose outer periphery may move radially outward (e.g., grow or expand) when under thermal stress. The first radial deflection portion 208" defines a radial gap between the first radial portion 204" and the second radial portion 232 of the heat shield 200. For example, the first radial deflection portion 208" may have a U-shaped configuration having an outer wall 210", a connecting wall 212", and an inner wall 214".

The outer wall 210", the connecting wall 212", and the inner wall 214" of the first radial deflection portion 208" may be arranged relative to the first radial portion 204", the second radial portion 232, the axis, and each other in manners similar to the radial deflection portion 208 described previously. The outer wall 210" may be arranged parallel or substantially parallel to the axis and/or perpendicular or substantially perpendicular to the first radial portion 204". The outer wall 210" may have an axial length that is greater than that of the inner wall 214". The connecting wall 212" may extend radially inward from the outer wall 210" to the inner wall 214". The connecting wall 212" may be arranged perpendicular or substantially perpendicular to the axis and/or the outer wall 210". The inner wall 214" extends axially from an inner periphery of the connecting wall 212" to the second radial portion 232. The inner wall 214" may be arranged parallel or substantially parallel to the axis and/or perpendicular or substantially perpendicular to the connecting wall 212" and/or the second radial portion 232. When the heat shield 200" is assembled in the turbocharger, the first radial deflection portion 208" may protrude away from the bearing housing 170 and be recessed or flush with the axial surface of the volute wall of the turbine housing 120, as was described with respect to the radial deflection portion 208 of the heat shield 200 and the radial deflection portion 208' of the heat shield 200', respectively. The first radial deflection portion 208" may also be arranged axially between the turbine wheel 110 and the bearing housing 170. For further understanding of the second radial deflection portion 234, refer to discussion of the radial deflection portion 208 above.

The second radial portion 232 extends circumferentially around the axis and radially from the first radial deflection portion 208" to the second radial deflection portion 234. The second radial portion 232 may be referred to as an inner radial portion (e.g., relative to the first radial deflection portion 208"), an outer radial portion (e.g., relative to the second racial deflection portion 234), an outer primary portion, or a radially elongated portion. The second radial portion 232 has a radial dimension (e.g., radius) that is greater than that of the first radial deflection portion 208" and/or the second radial deflection portion 234, such as being two or more times greater. When the heat shield 200" is assembled into the turbocharger, the second radial portion 232 is arranged axially between the turbine wheel 110 and the bearing housing 170.

The second radial deflection portion 234 extends from the second radial portion 232 to the third radial portion 236. The second radial deflection portion 234 may be referred to as an inner radial deflection portion. The second radial deflection portion 234 may be configured similar to the first radial deflection portion 208" to accommodate relative radial movement between the second radial portion 232, whose inner periphery may move radially inward (e.g., grow or expand) when under thermal stress, and the third radial portion 236, whose outer periphery may move radially outward (e.g., grow or expand) when under thermal stress. The second radial deflection portion 234 defines a radial gap between the second radial portion 232 and the third radial portion 236. For example, the second radial deflection portion 234 may have a U-shaped configuration with an outer wall, a connecting wall, and an inner wall (not labeled), which are configured similar to the outer wall 210", the connecting wall 212", and the inner wall 214" of the first radial deflection portion 208". The second radial deflection portion 234 may, however, have different angles and/or dimensions than the first radial deflection portion 208", such as the inner and outer walls having a common axial length. When the heat shield 200" is assembled into the turbocharger, the second radial deflection portion 234 is arranged between the turbine wheel 110 and the bearing housing 170. For further understanding of the second radial deflection portion 234, refer to discussion of the radial deflection portion 208 and/or the first radial deflection portion 208".

The third radial portion 236 extends radially inward from the second radial deflection portion 234 to the central bore 220. The third radial portion 236 may be referred to as an inner primary portion or a radially elongated portion. The third radial portion 236 has a radial dimension (e.g., radius) that is greater than that of the first radial deflection portion 208" and/or the second radial deflection portion 234, such as being two or more times greater. When the heat shield 200" is assembled into the turbocharger, the third radial portion 236 is arranged axially between the turbine wheel 110 and the bearing housing 170.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A heat shield for a turbocharger, the heat shield having a disc-like configuration defining a central bore, the heat shield comprising:
   an outer radial portion disposed circumferentially around an axis of the heat shield;
   an outer wall extending from the outer radial portion;
   a connecting wall extending radially inward from the outer wall; and
   an inner wall extending from the connecting wall, the inner wall being spaced radially outward of the central bore.

2. The heat shield of claim 1, the outer wall originates and extends in a first axial direction from a first plane to a second plane, and the inner wall extends in a second axial direction to terminate in a third plane that is parallel with and between the first plane and the second plane.

3. The heat shield of claim 2, wherein the outer wall originates in the first plane and terminates in the second plane.

4. The heat shield of claim 3, wherein the connecting wall extends radially inward in the second plane.

5. The heat shield of claim 1, wherein the outer wall and the inner wall have different axial dimensions.

6. The heat shield of claim 1, wherein the outer wall, the connecting wall, and the inner wall form an intermediate radial portion that extends radially between the outer radial portion and an inner radial portion.

7. The heat shield of claim 6, wherein the intermediate radial portion is adapted to fit into a recess formed between an inner radial end of a volute wall of a turbine housing of the turbocharger.

8. The heat shield of claim 6, wherein the intermediate radial portion is adapted to deflect in response to relative radial movement between an inner periphery of the outer radial portion and an outer periphery of the inner radial portion, the relative radial movement being caused by thermal stress of the heat shield.

9. The heat shield of claim 8, wherein the outer wall is adapted to bend radially outward relative to the outer radial portion.

10. The heat shield of claim 8, wherein the relative radial movement includes the inner periphery of the outer radial portion and the outer periphery of the inner radial portion moving radially closer to each other.

11. The heat shield of claim 1, wherein the outer wall extends from the outer radial portion in a first axial direction, and the inner wall extends from the connecting wall in a second axial direction opposite the first axial direction.

12. The heat shield of claim 11, wherein the connecting wall extends substantially perpendicularly from the outer wall.

13. The heat shield of claim 12, wherein the inner wall extends substantially perpendicularly from the connecting wall.

14. A heat shield to be arranged in a turbocharger between a turbine housing and a bearing housing thereof, the heat shield comprising:
   a first radial portion;
   a second radial portion arranged radially inward of the first radial portion; and
   a radial deflection portion extending radially from the first radial portion to the second radial portion, wherein the radial deflection portion is U-shaped with an outer wall extending from the first radial portion substantially parallel with an axis of the heat shield, a connecting wall extending radially inward from the outer wall, and an inner wall extending from the connecting wall substantially parallel with the axis to the second radial portion.

15. The heat shield of claim 14, wherein the second radial portion has a radial dimension that is more than two times greater than the radial deflection portion.

16. The heat shield of claim 15, wherein the radial deflection portion is configured to deflect with relative radial movement between the first radial portion and the second radial portion from thermal stress of the heat shield.

17. The heat shield of claim 14, further comprising another radial deflection portion and a third radial deflection portion, wherein the other radial deflection portion extends radially inward from the second radial portion, and the third radial portion extends radially inward from the other radial deflection portion, wherein the other radial deflection portion is U-shaped with another outer wall extending from the second radial portion substantially parallel with an axis of the heat shield, another connecting wall extending radially inward from the other outer wall, and another inner wall extending radially inward from the connecting wall substantially parallel with the axis to the third radial portion.

18. The heat shield of claim 17, wherein the third radial portion has a radial dimension that is more than two times greater than the other radial deflection portion.

19. The heat shield of claim 18, wherein the other radial deflection portion is configured to deflect with relative radial movement between the second radial portion and the third radial portion from thermal stress of the heat shield.

20. The heat shield of claim 14, wherein the outer wall and the inner wall have different axial dimensions.

21. A turbocharger assembly comprising:
   a turbine housing;
   a turbine wheel in the turbine housing;
   a bearing housing;
   a shaft coupled to the turbine wheel and extending into the bearing housing; and
   a heat shield arranged between the turbine housing and the bearing housing, the heat shield defining a central bore and including:
      an outer radial portion;
      an inner radial portion;
      an outer wall extending from the outer radial portion;
      a connecting wall extending radially inward from the outer wall; and
      an inner wall extending from the connecting wall to the inner radial portion, the inner wall being spaced radially outward of the central bore.

22. The turbocharger assembly of claim 21, wherein the outer wall, the connecting wall, and the inner wall cooperatively form a radial deflection portion of the heat shield, the radial deflection portion permitting relative radial movement between the inner radial portion and the outer radial portion.

23. The turbocharger assembly of claim 22, the radial deflection portion is U-shaped and forms a gap extending radially between the outer radial portion and the inner radial portion and circumferentially around the shaft to permit relative radial movement between the outer radial portion and the inner radial portion.

24. The turbocharger assembly of claim 23, wherein the relative radial movement includes one or more of an inner periphery of the outer radial portion moving radially inward and an outer periphery of the inner radial portion moving radially outward.

25. The turbocharger assembly of claim 21, wherein the outer wall extends from the outer radial portion in substantially parallel relation to the shaft.

26. The turbocharger assembly of claim 25, wherein the inner wall extends from the connecting wall in substantially parallel relation to the shaft.

\* \* \* \* \*